(12) United States Patent
Burrell, IV

(10) Patent No.: US 7,160,042 B2
(45) Date of Patent: Jan. 9, 2007

(54) TWO SENSOR MOVEMENT

(76) Inventor: James W. Burrell, IV, P.O. Box 3822, Union, NJ (US) 07083

( * ) Notice: Subject to any disclaimer, the term of this patent is extended or adjusted under 35 U.S.C. 154(b) by 842 days.

(21) Appl. No.: 10/241,119

(22) Filed: Sep. 11, 2002

(65) Prior Publication Data
US 2004/0143348 A1  Jul. 22, 2004

(51) Int. Cl.
*B41J 5/28* (2006.01)
*G05B 15/00* (2006.01)
(52) U.S. Cl. ............... 400/472; 400/485; 700/84
(58) Field of Classification Search .......... 345/156, 345/856, 700, 160, 163, 157, 168; 715/856, 715/857; 700/61, 66, 83, 84, 85, 11, 12, 700/13, 17, 20; 400/472, 485
See application file for complete search history.

(56) References Cited
U.S. PATENT DOCUMENTS

| | | | | |
|---|---|---|---|---|
| 5,510,811 A | * | 4/1996 | Tobey et al. ............ 345/157 |
| 5,675,361 A | * | 10/1997 | Santilli ..................... 345/168 |
| 5,711,624 A | * | 1/1998 | Klauber .................... 400/486 |
| 6,190,068 B1 | * | 2/2001 | Chao ........................ 400/472 |
| 7,081,883 B1 | * | 7/2006 | Chen ........................ 345/163 |
| 2005/0063757 A1 | * | 3/2005 | Sugimura et al. ........ 400/472 |
| 2005/0169689 A1 | * | 8/2005 | McLoone et al. ......... 400/493 |
| 2005/0174334 A1 | * | 8/2005 | Hannay .................... 345/169 |
| 2006/0146026 A1 | * | 7/2006 | Shim ........................ 345/168 |
| 2006/0181511 A1 | * | 8/2006 | Woolley ................... 345/160 |

* cited by examiner

*Primary Examiner*—Anthony Knight
*Assistant Examiner*—Jennifer L. Norton
(74) *Attorney, Agent, or Firm*—Ezra Sutton, Esq.

(57) ABSTRACT

Multiple methods of using only two sensors to control the state of an object in a one dimensional environment, a two dimensional environment or a three dimensional environment. A method of using only two sensors to control the state of an object in a secondary mode and edit data in a third mode. A method of using only two sensors to edit changes. A method of using only two sensors to control the state of an object in graphic arts programs. A method of using only two sensors to control the state of an object in two states, three states, four states, eight states, ten states or fourteen states. A method of using only two sensors to increase or decrease control of an object.

20 Claims, 1 Drawing Sheet

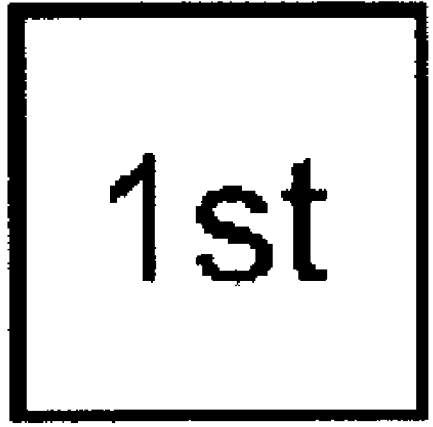
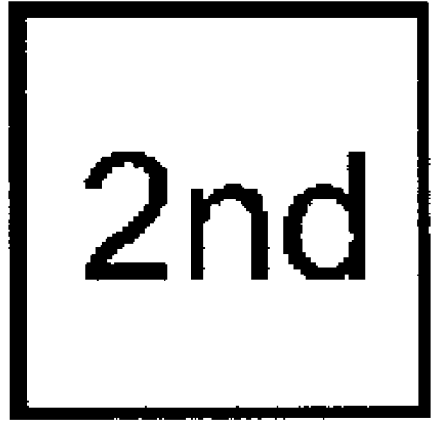

TWO SENSOR MOVEMENT

FIELD OF THE INVENTION

This invention relates to a method of control using only two sensors.

BACKGROUND OF THE INVENTION

This application is an improvement on the method of control in U.S. Pat. No. 5,993,089 entitled, "8-BIT BINARY CODE FOR USE AS AN 8-DOT BRAILLE ARRANGEMENT AND DATA ENTRY SYSTEM AND METHOD FOR 8-KEY CHORDIC BINARY KEYBOARDS", in which a copyright and a patent were granted. This application is also an improvement on the invention found in U.S. patent application Ser. No. 10/071,952 filed on Feb. 6th, 2002 entitled, "VIRTUAL KEYBOARD AND CONTROL MEANS".

DESCRIPTION OF PRIOR ART

There are numerous well-known, prior art methods of moving using two sensors independently, the best and oldest examples would be an animal pulled plow and the motor driven tractor. With the rapid development of man-machine interfaces for communicating and control, improved methods of movement and control means are becoming increasingly necessary. The main objective of the present invention is to overcome all the deficiencies found in all prior art devices for two sensor control.

SUMMARY OF THE INVENTION

Briefly described, in one of the preferred embodiments of the present invention uses any two binary sensors or two variable controlled sensors to control the state of an object in a first state by activating a first sensor, control the state of an object in a second state by activating a second sensor, control the state of an object in a third state by activating a first sensor and a second sensor simultaneously and control the state of an object in a fourth state by deactivating and reactivating a first sensor and a second sensor simultaneously. Control of any object, robot, cursor, machine, virtual reality environment, etc. in a one dimensional environment or two dimensional environment can easily be obtained using only two sensors. A computer mouse is one preferred embodiment of the invention. The ability to use a two sensor keyboard to reverse the last change made or to reverse the last undo made while using a pointing device in a graphics program, will increase the speed and efficiency in any graphics program or any other two axis cursor pointing program.

One preferred embodiment of the present invention allows multiple methods of control using only two sensors. Simultaneously activating a first sensor and a second sensor followed by simultaneously deactivating a first sensor and a second sensor will exit a first mode and enter a second mode. Independently activating a first sensor will control the state of an object in a first state. Deactivating a first sensor will stop control in a first state. Independently activating a second sensor will control the state of an object in a second state. Deactivating a second sensor will stop control in a second state. Simultaneously activating a first sensor and a second sensor followed by simultaneously deactivating a first sensor and a second sensor will exit a second mode and enter a third mode.

Another preferred embodiment of the present invention allows another method of control using only two sensors. Independently activating a first sensor to reverse the last change. Independently activating a second sensor to reverse the last undo.

Another preferred embodiment of the present invention allows another method of control using only two sensors. Independently activating a first sensor will control the state of an object in a first state. Deactivating a first sensor will stop control in a first state. Independently activating a second sensor will control the state of an object in a second state. Deactivating a second sensor will stop control in a second state. Simultaneously activating a first sensor and a second sensor will control the state of an object in a third state. Deactivating a second sensor will control the state of an object in a fifth state. Simultaneously activating a first sensor and a second sensor will control the state of an object in a third state. Deactivating a first sensor will control the state of an object in a sixth state. Simultaneously activating a first sensor and a second sensor will control the state of an object in a third state. Simultaneously deactivating a first sensor and a second sensor will stop control in a third state. Simultaneously activating a first sensor and a second sensor will control the state of an object in a fourth state. Deactivating a second sensor will control the state of an object in a seventh state. Simultaneously activating a first sensor and a second sensor will control the state of an object in a fourth state. Deactivating a first sensor will control the state of an object in an eighth state. Simultaneously activating a first sensor and a second sensor will control the state of an object in a fourth state. Simultaneously deactivating a first sensor and a second sensor will stop control in a fourth state. Simultaneously activating a first sensor and a second sensor will control the state of an object in a third state.

Another preferred embodiment of the present invention allows another method of control using only two sensors. Independently activating a third sensor of a second set of two sensors will control the state of an object in a ninth state. Deactivating a third sensor will stop control in a ninth state. Independently activating a fourth sensor of a second set of two sensors will control the state of an object in a tenth state. Deactivating a fourth sensor will stop control in a tenth state. Simultaneously activating a third sensor and a fourth sensor will control the state of an object in a third state. Deactivating a fourth sensor will control the state of an object in an eleventh state. Simultaneously activating a third sensor and a fourth sensor will control the state of an object in a third state. Deactivating a third sensor will control the state of an object in a twelfth state. Simultaneously activating a third sensor and a fourth sensor will control the state of an object in a third state. Simultaneously deactivating a third sensor and a fourth sensor will stop control in a third state. Simultaneously activating a third sensor and a fourth sensor will control the state of an object in a fourth state. Deactivating a fourth sensor will control the state of an object in a thirteenth state. Simultaneously activating a third sensor and a fourth sensor will control the state of an object in a fourth state. Deactivating a third sensor will control the state of an object in a fourteenth state. Simultaneously activating a third sensor and a fourth sensor will control the state of an object in a fourth state. Simultaneously deactivating a third sensor and a fourth sensor will stop control in a fourth state. Simultaneously activating a third sensor and a fourth sensor will control the state of an object in a third state.

Another preferred embodiment of the present invention allows another method of control and rate of control using only two sensors. Using any adjustable sensor will increase or decrease the rate of an object by producing different degrees of activation. Activating an adjustable first sensor will control the state of an object. Increasing the activation parameters of an adjustable first sensor will increase the rate of control of an object and decreasing the activation parameters of an adjustable first sensor will decrease the rate of control of an object. Activating an adjustable second sensor will control the state of an object. Increasing the activation parameters of an adjustable second sensor will increase the rate of control of an object and decreasing the activation parameters of an adjustable second sensor will decrease the rate of control of an object.

The system and method of the two sensor control invention, according to the preferred embodiment and alternative preferred embodiments of the invention, are logically developed, relatively easy to learn and very quick to use.

These and other features of the present invention will be more fully understood by reference to the following drawings and the detailed description of the preferred embodiment.

DESCRIPTION OF THE DRAWINGS

FIG. 1. Illustrates one preferred arrangement of a two sensor embodiment found in the disclosed invention.

FIG. 2. Illustrates one preferred arrangement of a two sensor embodiment found in the disclosed invention.

FIG. 3. Illustrates one preferred arrangement of a horizontal first set of two sensors embodiment combined with a vertical second set of two sensors embodiment positioned on the left, found in the disclosed invention.

FIG. 4. Illustrates one preferred arrangement of a horizontal first set of two sensors embodiment combined with a vertical second set of two sensors embodiment positioned on the right, found in the disclosed invention.

DETAILED DESCRIPTION OF THE PREFERRED EMBODIMENT

In order to more fully understand the invention, during the course of this description the two sensor invention will be labeled as a first sensor and a second sensor, unless a second set of two sensors is added, and will be used to easily identify like elements according to the different figures which illustrate the invention. The preferred embodiment of the invention is shown in FIGS. 1, 2, 3 and 4 in the preferred embodiment's simplest binary sensor on/off method form.

One preferred embodiment of the present invention uses any two binary sensors or two variable controlled sensors for control in a first state by activating a first sensor, and in a second state by activating a second sensor. Control of any object, robot, cursor, machine, virtual reality environment, etc. in a one dimensional environment or two dimensional environment can easily be obtained using only two sensors. A computer mouse is one preferred embodiment of the invention. Other examples of two sensor preferred embodiments of the invention are the cursor left and cursor right keys on a standard computer keyboard, the left and right space bar keys on a split space bar computer keyboard, any two keys on a standard computer keyboard, any two keys on any keyboard or data entry device ever produced or will ever be produced. The ability to use a two sensor keyboard to reverse the last change made or to reverse the last undo made while using a pointing device in a graphics program, will increase the speed and efficiency in any graphics program or any other two axis cursor pointing program. Any two binary sensors or two variable controlled sensors includes but is not limited to: accelerometers, biometric sensors, biosensors, flex sensors, micro force sensors, motion sensors, optical sensors, piezoelectric force sensors, position sensors, pressure sensors, temperature sensors, touch sensors, touch screen sensors, contact switch, detector switch, dimmer switch, dual motion switch, electromechanical switch, key switch, membrane switch, pushbutton switch, rocker switch, rotary switch, snap action switch, toggle switch, vertical touch switch, and the like.

One preferred embodiment of the present invention allows multiple methods of control using only two sensors. Simultaneously activating a first sensor, preferably a left sensor, and a second sensor, preferably a right sensor, followed by simultaneously deactivating a first sensor, preferably a left sensor, and a second sensor, preferably a right sensor, will exit a first mode and enter a second mode. Independently activating a first sensor, preferably a left sensor, will control the state of an object in a first state, preferably to the left. Deactivating a first sensor, preferably a left sensor, will stop control in a first state, preferably to the left. Independently activating a second sensor, preferably a right sensor, will control the state of an object in a second state, preferably to the right. Deactivating a second sensor, preferably a right sensor, will stop control in a second state, preferably to the right. Simultaneously activating a first sensor, preferably a left sensor, and a second sensor, preferably a right sensor, followed by simultaneously deactivating a first sensor, preferably a left sensor, and a second sensor, preferably a right sensor, will exit a second mode and enter a third mode.

Another preferred embodiment of the present invention allows another method of control using only two sensors. Simultaneously activating a first sensor, preferably a left sensor, and a second sensor, preferably a right sensor, followed by simultaneously deactivating a first sensor, preferably a left sensor, and a second sensor, preferably a right sensor, will exit a first mode and enter a second mode. Independently activating a first sensor, preferably a left sensor, will control the state of an object in a first state, preferably to the left. Deactivating a first sensor, preferably a left sensor, will stop control in a first state, preferably to the left. Independently activating a second sensor, preferably a right sensor, will control the state of an object in a second state, preferably to the right. Deactivating a second sensor, preferably a right sensor, will stop control in a second state, preferably to the right. Simultaneously activating a first sensor, preferably a left sensor, and a second sensor, preferably a right sensor, followed by simultaneously deactivating a first sensor, preferably a left sensor, and a second sensor, preferably a right sensor, will exit a second mode and re-enter a first mode.

Another preferred embodiment of the present invention allows another method of control using only two sensors. Simultaneously activating a first sensor, preferably a left sensor, and a second sensor, preferably a right sensor, followed by simultaneously deactivating a first sensor, preferably a left sensor, and a second sensor, preferably a right sensor, will exit a first mode and enter a second mode. Independently activating a first sensor, preferably a left sensor, will control the state of an object in a first state, preferably to the left. Deactivating a first sensor, preferably a left sensor, will stop control in a first state, preferably to the left. Independently activating a second sensor, preferably a right sensor, will control the state of an object in a second state, preferably to the right. Deactivating a second sensor, preferably a right sensor, will stop control in a second state, preferably to the right. Simultaneously activating a first sensor, preferably a left sensor, and a second sensor, preferably a right sensor, followed by simultaneously deactivating a first sensor, preferably a left sensor, and a second sensor, preferably a right sensor, will exit a second mode and enter a third mode. Independently activating a first sensor, preferably a left sensor, will control the state of an object in a first state, preferably to the left. Deactivating a first sensor, preferably a left sensor, will stop control in a first state, preferably to the left. Independently activating a second sensor, preferably a right sensor, will control the state of an object in a second state, preferably to the right. Deactivating a second sensor, preferably a right sensor, will stop control in a second state, preferably to the right. Simultaneously activating a first sensor, preferably a left sensor, and a second sensor, preferably a right sensor, followed by simultaneously deactivating a first sensor, preferably a left sensor, and a second sensor, preferably a right sensor, will exit a second mode and re-enter a first mode.

Another preferred embodiment of the present invention allows another method of control using only two sensors. Simultaneously activating a first sensor, preferably a left sensor, and a second sensor, preferably a right sensor, followed by simultaneously deactivating a first sensor, preferably a left sensor, and a second sensor, preferably a right sensor, will exit a first mode and enter a second mode. Independently activating a first sensor, preferably a left sensor, will control the state of an object in a first state, preferably to the left. Deactivating a first sensor, preferably a left sensor, will stop control in a first state, preferably to the left. Independently activating a second sensor, preferably a right sensor, will control the state of an object in a second state, preferably to the right. Deactivating a second sensor, preferably a right sensor, will stop control in a second state, preferably to the right. Simultaneously activating a first sensor, preferably a left sensor, and a second sensor, preferably a right sensor, followed by simultaneously deactivating a first sensor, preferably a left sensor, and a second sensor, preferably a right sensor, will exit a second mode and enter a third mode. Independently activating a first sensor, preferably a left sensor, will delete data in a first state, preferably to the left of an object. Deactivating a first sensor, preferably a left sensor, will stop deleting data in a first state, preferably to the left of an object. Independently activating a second sensor, preferably a right sensor, will delete data in a second state, preferably to the right of an object. Deactivating a first sensor, preferably a left sensor, will stop deleting data in a second state, preferably to the right of an object. Simultaneously activating a first sensor, preferably a left sensor, and a second sensor, preferably a right sensor, followed by simultaneously deactivating a first sensor, preferably a left sensor, and a second sensor, preferably a right sensor, will exit a third mode and re-enter a first mode.

Another preferred embodiment of the present invention allows another method of control using only two sensors. Independently activating a first sensor, preferably a left sensor, to reverse the last change. Independently activating a second sensor, preferably a right sensor, to reverse the last undo.

One preferred embodiment of the present invention uses any two binary sensors or two variable controlled sensors to control the state of an object in a first state by activating a third sensor, control the state of an object in a second state by activating a fourth sensor, control the state of an object in a third state by activating a third sensor and a fourth sensor simultaneously and control the state of an object in a fourth state by deactivating and reactivating a third sensor and a fourth sensor simultaneously. A second set of two sensors allows complete control in a three dimensional environment. A computer mouse and two keys on any keyboard are preferred embodiments of the invention. Other examples of two sensor preferred embodiments of the invention are the cursor left and cursor right keys combined with any other two keys on a standard computer keyboard, the left and right space bar keys combined with any other two keys on a split space bar computer keyboard, any two keys combined with any other two keys on a standard computer keyboard, any two keys combined with any other two keys on any keyboard or data entry device ever produced or that will ever be produced.

Another preferred embodiment of the present invention allows another method of control using only two sensors. Independently activating a first sensor, preferably a left sensor, will control the state of an object in a first state, preferably to the left. Deactivating a first sensor, preferably a left sensor, will stop control in a first state, preferably to the left. Independently activating a second sensor, preferably a right sensor, will control the state of an object in a second state, preferably to the right. Deactivating a second sensor, preferably a right sensor, will stop control in a second state, preferably to the right. Simultaneously activating a first sensor, preferably a left sensor, and a second sensor, preferably a right sensor, will control the state of an object in a third state, preferably forward. Simultaneously deactivating a first sensor, preferably a left sensor, and a second sensor, preferably a right sensor, will stop control in a third state, preferably forward.

Another preferred embodiment of the present invention allows another method of control using only two sensors. Independently activating a first sensor, preferably a left sensor, will control the state of an object in a first state, preferably to the left. Deactivating a first sensor, preferably a left sensor, will stop control in a first state, preferably to the left. Independently activating a second sensor, preferably a right sensor, will control the state of an object in a second state, preferably to the right. Deactivating a second sensor, preferably a right sensor, will stop control in a second state, preferably to the right. Simultaneously activating a first sensor, preferably a left sensor, and a second sensor, preferably a right sensor, will control the state of an object in a third state, preferably forward. Simultaneously deactivating a first sensor, preferably a left sensor, and a second sensor, preferably a right sensor, will stop control in a third state, preferably forward. Simultaneously activating a first sensor, preferably a left sensor, and a second sensor, preferably a right sensor, will control the state of an object in a fourth state, preferably backward. Simultaneously deactivating a first sensor, preferably a left sensor, and a second sensor, preferably a right sensor, will stop control in a fourth state, preferably backward. Simultaneously activating a first sensor, preferably a left sensor, and a second sensor, preferably a right sensor, will control the state of an object in a third state, preferably forward.

Another preferred embodiment of the present invention allows another method of control using only two sensors. Independently activating a first sensor, preferably a left sensor, will control the state of an object in a first state, preferably to the left. Deactivating a first sensor, preferably a left sensor, will stop control in a first state, preferably to the left. Independently activating a second sensor, preferably a right sensor, will control the state of an object in a second state, preferably to the right. Deactivating a second sensor, preferably a right sensor, will stop control in a second state, preferably to the right. Simultaneously activating a first sensor, preferably a left sensor, and a second sensor, preferably a right sensor, will control the state of an object upward. Simultaneously deactivating a first sensor, preferably a left sensor, and a second sensor, preferably a right sensor, will stop upward control. Simultaneously activating a first sensor, preferably a left sensor, and a second sensor, preferably a right sensor, will control the state of an object downward. Simultaneously deactivating a first sensor, preferably a left sensor, and a second sensor, preferably a right sensor, will stop downward control. Simultaneously activating a first sensor, preferably a left sensor, and a second sensor, preferably a right sensor, will control the state of an object upward.

Another preferred embodiment of the present invention allows another method of control using only two sensors. Independently activating a first sensor, preferably a left sensor, will control the state of an object in a first state, preferably to the left. Deactivating a first sensor, preferably a left sensor, will stop control in a first state, preferably to the left. Independently activating a second sensor, preferably a right sensor, will control the state of an object in a second state, preferably to the right. Deactivating a second sensor, preferably a right sensor, will stop control in a second state, preferably to the right. Simultaneously activating a first sensor, preferably a left sensor, and a second sensor, preferably a right sensor, will control the state of an object in a third state, preferably forward. Deactivating a second sensor, preferably a right sensor, will control the state of an object in a fifth state, preferably forward and to the left. Simultaneously activating a first sensor, preferably a left sensor, and a second sensor, preferably a right sensor, will control the state of an object in a third state, preferably forward. Deactivating a first sensor, preferably a left sensor, will control the state of an object in a sixth state, preferably forward and to the right. Simultaneously activating a first sensor, preferably a left sensor, and a second sensor, preferably a right sensor, will control the state of an object in a third state, preferably forward. Simultaneously deactivating a first sensor, preferably a left sensor, and a second sensor, preferably a right sensor, will stop control in a third state, preferably forward. Independently activating a first sensor, preferably a left sensor, will control the state of an object in a first state, preferably to the left. Deactivating a first sensor, preferably a left sensor, will stop control in a first state, preferably to the left. Independently activating a second sensor, preferably a right sensor, will control the state of an object in a second state, preferably to the right. Deactivating a second sensor, preferably a right sensor, will stop control in a second state, preferably to the right. Simultaneously activating a first sensor, preferably a left sensor, and a second sensor, preferably a right sensor, will control the state of an object in a fourth state, preferably backward. Deactivating a second sensor, preferably a right sensor, will control the state of an object in a seventh state, preferably backward and to the left. Simultaneously activating a first sensor, preferably a left sensor, and a second sensor, preferably a right sensor, will control the state of an object in a fourth state, preferably backward. Deactivating a first sensor, preferably a left sensor, will control the state of an object in an eighth state, preferably backward and to the right. Simultaneously activating a first sensor, preferably a left sensor, and a second sensor, preferably a right sensor, will control the state of an object in a fourth state, preferably backward. Simultaneously deactivating a first sensor, preferably a left sensor, and a second sensor, preferably a right sensor, will stop control in a fourth state, preferably backward. Independently activating a first sensor, preferably a left sensor, will control the state of an object in a first state, preferably to the left. Deactivating a first sensor, preferably a left sensor, will stop control in a first state, preferably to the left. Independently activating a second sensor, preferably a right sensor, will control the state of an object in a second state, preferably to the right. Deactivating a second sensor, preferably a right sensor, will stop control in a second state, preferably to the right. Simultaneously activating a first sensor, preferably a left sensor, and a second sensor, preferably a right sensor, will control the state of an object in a third state, preferably forward.

Another preferred embodiment of the present invention allows another method of control using only two sensors. Independently activating a first sensor, preferably a left sensor, will control the state of an object in a first state, preferably to the left. Deactivating a first sensor, preferably a left sensor, will stop control in a first state, preferably to the left. Independently activating a second sensor, preferably a right sensor, will control the state of an object in a second state, preferably to the right. Deactivating a second sensor, preferably a right sensor, will stop control in a second state, preferably to the right. Simultaneously activating a first sensor, preferably a left sensor, and a second sensor, preferably a right sensor, will control the state of an object in a third state, preferably upward. Deactivating a second sensor, preferably a right sensor, will control the state of an object in a fifth state, preferably upward and to the left. Simultaneously activating a first sensor, preferably a left sensor, and a second sensor, preferably a right sensor, will control the state of an object in a third state, preferably upward. Deactivating a first sensor, preferably a left sensor, will control the state of an object in a sixth state, preferably upward and to the right. Simultaneously activating a first sensor, preferably a left sensor, and a second sensor, preferably a right sensor, will control the state of an object in a third state, preferably upward. Simultaneously deactivating a first sensor, preferably a left sensor, and a second sensor, preferably a right sensor, will stop control in a third state, preferably upward. Independently activating a first sensor, preferably a left sensor, will control the state of an object in a first state, preferably to the left. Deactivating a first sensor, preferably a left sensor, will stop control in a first state, preferably to the left. Independently activating a second sensor, preferably a right sensor, will control the state of an object in a second state, preferably to the right. Deactivating a second sensor, preferably a right sensor, will stop control in a second state, preferably to the right. Simultaneously activating a first sensor, preferably a left sensor, and a second sensor, preferably a right sensor, will control the state of an object in a fourth state, preferably downward. Deactivating a second sensor, preferably a right sensor, will control the state of an object in a seventh state, preferably downward and to the left. Simultaneously activating a first sensor, preferably a left sensor, and a second sensor, preferably a right sensor, will control the state of an object in a fourth state, preferably downward. Deactivating a first sensor, preferably a left sensor, will control the state of an object in an eighth state, preferably downward and to the right. Simultaneously activating a first sensor, preferably a left sensor, and a second sensor, preferably a right sensor, will control the state of an object in a fourth state, preferably downward. Simultaneously deactivating a first sensor, preferably a left sensor, and a second sensor, preferably a right sensor, will stop control in a fourth state, preferably downward. Independently activating a first sensor, preferably a left sensor, will control the state of an object in a first state, preferably to the left. Deactivating a first sensor, preferably a left sensor, will stop control in a first state, preferably to the left. Independently activating a second sensor, preferably a right sensor, will control the state of an object in a second state, preferably to the right. Deactivating a second sensor, preferably a right sensor, will stop control in a second state, preferably to the right. Simultaneously activating a first sensor, preferably a left sensor, and a second sensor, preferably a right sensor, will control the state of an object in a third state, preferably upward.

Another preferred embodiment of the present invention allows another method of control using only two sensors. Independently activating a third sensor, preferably a top sensor, of a second set of two sensors will control the state of an object in a ninth state, preferably upward. Deactivating a third sensor, preferably a top sensor, will stop control in a ninth state, preferably upward. Independently activating a fourth sensor, preferably a bottom sensor, of a second set of two sensors will control the state of an object in a tenth state, preferably downward. Deactivating a fourth sensor, preferably a bottom sensor, will stop control in a tenth state, preferably downward. Simultaneously activating a third sensor, preferably a top sensor, and a fourth sensor, preferably a bottom sensor, will control the state of an object in a third state, preferably forward. Simultaneously deactivating a third sensor, preferably a top sensor, and a fourth sensor, preferably a bottom sensor, will stop control in a third state, preferably forward. Simultaneously activating a third sensor, preferably a top sensor, and a fourth sensor, preferably a bottom sensor, will control the state of an object in a fourth state, preferably backward. Simultaneously deactivating a third sensor, preferably a top sensor, and a fourth sensor, preferably a bottom sensor, will stop control in a fourth state, preferably backward. Simultaneously activating a third sensor, preferably a top sensor, and a fourth sensor, preferably a bottom sensor, will control the state of an object in a third state, preferably forward.

Another preferred embodiment of the present invention allows another method of control using only two sensors. Independently activating a third sensor, preferably a top sensor, of a second set of two sensors will control the state of an object in a ninth state, preferably upward. Deactivating a third sensor, preferably a top sensor, will stop control in a ninth state, preferably upward. Independently activating a fourth sensor, preferably a bottom sensor, of a second set of two sensors will control the state of an object in a tenth state, preferably downward. Deactivating a fourth sensor, preferably a bottom sensor, will stop control in a tenth state, preferably downward. Simultaneously activating a third sensor, preferably a top sensor, and a fourth sensor, preferably a bottom sensor, will control the state of an object in a third state, preferably forward. Deactivating a fourth sensor, preferably a bottom sensor, will control the state of an object in an eleventh state, preferably forward and upward. Simultaneously activating a third sensor, preferably a top sensor, and a fourth sensor, preferably a bottom sensor, will control the state of an object in a third state, preferably forward. Deactivating a third sensor, preferably a top sensor, will control the state of an object in a twelfth state, preferably forward and downward. Simultaneously activating a third sensor, preferably a top sensor, and a fourth sensor, preferably a bottom sensor, will control the state of an object in a third state, preferably forward. Simultaneously deactivating a third sensor, preferably a top sensor, and a fourth sensor, preferably a bottom sensor, will stop control in a third state, preferably forward. Independently activating a third sensor, preferably a top sensor, will control the state of an object in a ninth state, preferably upward. Deactivating a third sensor, preferably a top sensor, will stop control in a ninth state, preferably upward. Independently activating a fourth sensor, preferably a bottom sensor, will control the state of an object in a tenth state, preferably downward. Deactivating a fourth sensor, preferably a bottom sensor, will stop control in a tenth state, preferably downward. Simultaneously activating a third sensor, preferably a top sensor, and a fourth sensor, preferably a bottom sensor, will control the state of an object in a fourth state, preferably backward. Deactivating a fourth sensor, preferably a bottom sensor, will control the state of an object in a thirteenth state, preferably backward and upward. Simultaneously activating a third sensor, preferably a top sensor, and a fourth sensor, preferably a bottom sensor, will control the state of an object in a fourth state, preferably backward. Deactivating a third sensor, preferably a top sensor, will control the state of an object in a fourteenth state, preferably backward and downward. Simultaneously activating a third sensor, preferably a top sensor, and a fourth sensor, preferably a bottom sensor, will control the state of an object in a fourth state, preferably backward. Simultaneously deactivating a third sensor, preferably a top sensor, and a fourth sensor, preferably a bottom sensor, will stop control in a fourth state, preferably backward. Independently activating a third sensor, preferably a top sensor, will control the state of an object in a ninth state, preferably upward. Deactivating a third sensor, preferably a top sensor, will stop control in a ninth state, preferably upward. Independently activating a fourth sensor, preferably a bottom sensor, will control the state of an object in a tenth state, preferably downward. Deactivating a fourth sensor, preferably a bottom sensor, will stop control in a tenth state, preferably downward. Simultaneously activating a third sensor, preferably a top sensor, and a fourth sensor, preferably a bottom sensor, will control the state of an object in a third state, preferably forward.

Another preferred embodiment of the present invention allows another method of control and rate of control using only two sensors. Using any adjustable first sensor, preferably a left sensor, and any adjustable second sensor, preferably a right sensor, will increase or decrease the speed of an object in a desired state by producing different degrees of activation. Activating an adjustable first sensor, preferably a left sensor, will control the state of an object. Increasing the activation parameters of an adjustable first sensor, preferably a left sensor, will increase the rate of control of an object and decreasing the activation parameters of an adjustable first sensor, preferably a left sensor, will decrease the rate of control of an object. Activating an adjustable second sensor, preferably a right sensor, will control the state of an object. Increasing the activation parameters of an adjustable second sensor, preferably a right sensor, will increase the rate of control of an object and decreasing the activation parameters of an adjustable second sensor, preferably a right sensor, will decrease the rate of control of an object.

These and other features of the present invention will be more fully understood by referencing the drawings.

In summary, the two sensor control invention, according to the preferred embodiment and alternative preferred embodiments of the invention, is logically developed, relatively easy to learn and very quick to use.

While the invention has been described with reference to the preferred embodiment thereof, it will be appreciated by those of ordinary skill in the art that various modifications can be made to the system and method of the invention without departing from the spirit and scope of the invention as a whole.

I claim:

1. A method of using a pair of sensors to control the state of an object comprising:
   a) simultaneously activating a first sensor and a second sensor of said pair of sensors followed by simultaneously deactivating said first sensor and said second sensor to exit a first mode and enter a second mode;
   b) independently activating said first sensor to control the state of said object in a first state; and
   c) deactivating said first sensor to stop said control in said first state;
   d) independently activating said second sensor to control the state of said object in a second state; and
   e) deactivating said second sensor to stop said control in said second state;
   f) simultaneously activating said first sensor and said second sensor followed by simultaneously deactivating said first sensor and said second sensor to exit said second mode and enter a third mode;
   g) wherein the respective modes are entered and exited based on the activation or deactivation of only the two respective first and second sensors and no other sensors.

2. A method of using a pair of sensors to control the state of an object, in accordance with claim 1, comprising:
   a) simultaneously activating said first sensor and said second sensor followed by simultaneously deactivating said first sensor and said second sensor to exit said first mode and enter said second mode;
   b) independently activating said first sensor to control the state of said object in said first state; and
   c) deactivating said first sensor to stop said control in said first state;
   d) independently activating said second sensor to control the state of said object in said second state; and
   e) deactivating said second sensor to stop said control in said second state;
   f) simultaneously activating said first sensor and said second sensor followed by simultaneously deactivating said first sensor and said second sensor to exit said second mode and enter said first mode.

3. A method of using a pair of sensors to control the state of an object, in accordance with claim 1, comprising:
   a) simultaneously activating said first sensor and said second sensor followed by simultaneously deactivating said first sensor and said second sensor to exit said first mode and enter said second mode;
   b) independently activating said first sensor to control the state of said object to the left; and
   c) deactivating said first sensor to stop said control to the left;
   d) independently activating said second sensor to control the state of said object to the right; and
   e) deactivating said second sensor to stop said control to the right;
   f) simultaneously activating said first sensor and said second sensor followed by simultaneously deactivating said first sensor and said second sensor to exit said second mode and enter said third mode.

4. A method of using a pair of sensors to control the state of an object, in accordance with claim 1, comprising:
   a) simultaneously activating said first sensor and said second sensor followed by simultaneously deactivating said first sensor and said second sensor to exit said first mode and enter said second mode;
   b) independently activating said first sensor to control the state of said object in said first state; and
   c) deactivating said first sensor to stop said control in said first state;
   d) independently activating said second sensor to control the state of said object in said second state; and
   e) deactivating said second sensor to stop said control in said second state;
   f) simultaneously activating said first sensor and said second sensor followed by simultaneously deactivating said first sensor and said second sensor to exit said second mode and enter said third mode; and
   g) independently activating said first sensor to control the state of said object in said first state; and
   h) deactivating said first sensor to stop said control in said first state;
   i) independently activating said second sensor to control the state of said object in said second state; and
   j) deactivating said second sensor to stop said control in said second state;
   k) simultaneously activating said first sensor and said second sensor followed by simultaneously deactivating said first sensor and said second sensor to exit said second mode and enter said first mode.

5. A method of using a pair of sensors to control the state of an object, in accordance with claim 1, comprising:
   a) simultaneously activating said first sensor and said second sensor followed by simultaneously deactivating said first sensor and said second sensor to exit said first mode and enter said second mode;
   b) independently activating said first sensor to control the state of said object to the left; and
   c) deactivating said first sensor to stop said control to the left;
   d) independently activating said second sensor to control the state of said object to the right; and
   e) deactivating said second sensor to stop said control to the right;
   f) simultaneously activating said first sensor and said second sensor followed by simultaneously deactivating said first sensor and said second sensor to exit said second mode and enter said third mode;
   g) independently activating said first sensor to delete data to the left of an object; and
   h) deactivating said first sensor to stop deleting data to the left of said cursor;
   i) independently activating said second sensor to delete data to the right of said cursor; and
   j) deactivating said first sensor to stop deleting data to the right of said cursor;
   k) simultaneously activating said first sensor and said second sensor followed by simultaneously deactivating said first sensor and said second sensor to exit said third mode and enter said first mode.

6. A method of using a pair of sensors to control the state of an object comprising:
   a) independently activating a first sensor of said pair of sensors to control the state of said object in a first state; and
   b) deactivating said first sensor to stop said control in said first state;
   c) independently activating a second sensor of said pair of sensors to control the state of said object in a second state; and
   d) deactivating said second sensor to stop said control in said second state;
   e) simultaneously activating said first sensor and said second sensor to control the state of said object in a third state; and f) simultaneously deactivating said first sensor and said second sensor to stop said control in said third state;

g) wherein the respective states are controlled based on the activation or deactivation of only the two respective sensors for each state and no other sensors.

7. A method of using a pair of sensors to control the state of an object, in accordance with claim 6, comprising:

a) independently activating a first sensor of said a pair of sensors to control the state of said object to the left; and b) deactivating said first sensor to stop said control to the left;

c) independently activating a second sensor of said pair of sensors to control the state of said object to the right; and d) deactivating said second sensor to stop said control to the right;

e) simultaneously activating said first sensor and said second sensor to control the state of said object forward; and f) simultaneously deactivating said first sensor and said second sensor to stop said forward control.

8. A method of using a pair of sensors to control this state of an object, in accordance with claim 6, comprising:

a) independently activating a first sensor of said pair of sensors to control the state of said object in a first state; and b) deactivating said first sensor to stop said control in said first state;

c) independently activating a second sensor of said pair of sensors to control the state of said object in a second state; and d) deactivating said second sensor to stop said control in said second state;

e) simultaneously activating said first sensor and said second sensor to control the state of said object in a third state; and f) simultaneously deactivating said first sensor and said second sensor to stop said control in said third state;

g) simultaneously activating said first sensor and said second sensor to control the state of said object in a fourth state; and h) simultaneously deactivating said first sensor and said second sensor to stop said control in said fourth state;

i) simultaneously activating said first sensor and said second sensor to control the state of said object in said third state.

9. A method of using a pair of sensors to control the state of an object, in accordance with claim 6, comprising:

a) independently activating said first sensor to control the state of said object to the left; and b) deactivating said first sensor to stop said control to the left;

c) independently activating said second sensor to control the state of said object to the right; and d) deactivating said second sensor to stop said control to the right;

e) simultaneously activating said first sensor and said second sensor to control the state of said object forward; and f) simultaneously deactivating said first sensor and said second sensor to stop said forward control;

g) simultaneously activating said first sensor and said second sensor to control the state of said object backward; and h) simultaneously deactivating said first sensor and said second sensor to stop said backward control;

i) simultaneously activating said first sensor and said second sensor to control the state of said object forward.

10. A method of using a pair of sensors to control the state of an object, in accordance with claim 6, comprising:

a) independently activating said first sensor to control the state of said object to the left; and b) deactivating said first sensor to stop said control to the left;

c) independently activating said second sensor to control the state of said object to the right; and d) deactivating said second sensor to stop said control to the right;

e) simultaneously activating said first sensor and said second sensor to control the state of said object upward; and f) simultaneously deactivating said first sensor and said second sensor to stop said upward control;

g) simultaneously activating said first sensor and said second sensor to control the state of said object downward; and h) simultaneously deactivating said first sensor and said second sensor to stop said downward control;

i) simultaneously activating said first sensor and said second sensor to control the state of said object upward.

11. A method of using a pair of sensors to control the state of an object, in accordance with claim 6, comprising:

a) independently activating a first sensor of said pair of sensors to control the state of said object in a first state; and b) deactivating said first sensor to stop said control in said first state;

c) independently activating a second sensor of said pair of sensors to control the state of said object in a second state; and d) deactivating said second sensor to stop said control in said second state;

e) simultaneously activating said first sensor and said second sensor to control the state of said object in a third state; and f) deactivating said second sensor to control the state of said object in a fourth state;

g) simultaneously activating said first sensor and said second sensor to control the state of said object in said third state; and h) deactivating said first sensor to control the state of said object in a fifth state;

i) simultaneously activating said first sensor and said second sensor to control the state of said object in said third state; and j) simultaneously deactivating said first sensor and said second sensor to stop said control in said third state;

k) independently activating a first sensor of said pair of sensors to control the state of said object in a first state; and l) deactivating said first sensor to stop said control in said first state;

m) independently activating a second sensor of said pair of sensors to control the state of said object in a second state; and n) deactivating said second sensor to stop said control in said second state;

o) simultaneously activating said first sensor and said second sensor to control the state of said object in a sixth state; and p) deactivating said second sensor to control the state of said object in a seventh state;

q) simultaneously activating said first sensor and said second sensor to control the state of said object in said sixth state; and
r) deactivating said first sensor to control the state of said object in an eighth state;
s) simultaneously activating said first sensor and said second sensor to control the state of said object in said fourth state; and
t) simultaneously deactivating said first sensor and said second sensor to stop said control in said fourth state;
u) independently activating a first sensor of said pair of sensors to control the state of said object in a first state; and
v) deactivating said first sensor to stop said control in said first state;
w) independently activating a second sensor of said pair of sensors to control the state of said object in a second state; and
x) deactivating said second sensor to stop said control in said second state;
y) simultaneously activating said first sensor and said second sensor to control the state of said object in said third state.

12. A method of using a pair of sensors to control the state of an object, in accordance with claim 6, comprising:
a) independently activating said first sensor to control the state of said object to the left; and
b) deactivating said first sensor to stop said control to the left;
c) independently activating said first sensor to control the state of said object to the right; and
d) deactivating said first sensor to stop said control to the right;
e) simultaneously activating said first sensor and said second sensor to control the state of said object forward; and
f) deactivating said second sensor to control the state of said object forward and to the left;
g) simultaneously activating said first sensor and said second sensor to control the state of said object forward; and
h) deactivating said first sensor to control the state of said object forward and to the right;
i) simultaneously activating said first sensor and said second sensor to control the state of said object forward; and
j) simultaneously deactivating said first sensor and said second sensor to stop said forward control;
k) independently activating said first sensor to control the state of said object to the left; and
l) deactivating said first sensor to stop said control to the left;
m) independently activating said first sensor to control the state of said object to the right; and
n) deactivating said first sensor to stop said control to the right;
o) simultaneously activating said first sensor and said second sensor to control the state of said object backward; and
p) deactivating said second sensor to control the state of said object backward and to the left;
q) simultaneously activating said first sensor and said second sensor to control the state of said object backward; and
r) deactivating said first sensor to control the state of said object backward and to the right;
s) simultaneously activating said first sensor and said second sensor to control the state of said object backward; and
t) simultaneously deactivating said first sensor and said second sensor to stop said backward control;
u) independently activating said first sensor to control the state of said object to the left; and
v) deactivating said first sensor to stop said control to the left;
w) independently activating said first sensor to control the state of said object to the right; and
x) deactivating said first sensor to stop said control to the right;
y) simultaneously activating said first sensor and said second sensor to control the state of said object forward.

13. A method of using a pair two sensors to control the state of an object, in accordance with claim 6, comprising:
a) independently activating said first sensor to control the state of said object to the left; and
b) deactivating said first sensor to stop said control to the left;
c) independently activating said first sensor to control the state of said object to the right; and
d) deactivating said first sensor to stop said control to the right;
e) simultaneously activating said first sensor and said second sensor to control the state of said object upward; and
f) deactivating said second sensor to control the state of said object upward and to the left;
g) simultaneously activating said first sensor and said second sensor to control the state of said object upward; and
h) deactivating said first sensor to control the state of said object upward and to the right;
i) simultaneously activating said first sensor and said second sensor to control the state of said object upward; and
j) simultaneously deactivating said first sensor and said second sensor to stop said upward control;
k) independently activating said first sensor to control the state of said object to the left; and
l) deactivating said first sensor to stop said control to the left;
m) independently activating said first sensor to control the state of said object to the right; and
n) deactivating said first sensor to stop said control to the right;
o) simultaneously activating said first sensor and said second sensor to control the state of said object downward; and
p) deactivating said second sensor to control the state of said object downward and to the left;
q) simultaneously activating said first sensor and said second sensor to control the state of said object downward; and
r) deactivating said first sensor to control the state of said object downward and to the right;
s) simultaneously activating said first sensor and said second sensor to control the state of said object downward; and
t) simultaneously deactivating said first sensor and said second sensor to stop said downward control;
u) independently activating said first sensor to control the state of said object to the left; and v) deactivating said first sensor to stop said control to the left;

w) independently activating said first sensor to control the state of said object to the right; and x) deactivating said first sensor to stop said control to the right;

y) simultaneously activating said first sensor and said second sensor to control the state of said object upward.

14. A method of using a pair of sensors to control the state of an object, in accordance with claim 11, comprising:

a) independently activating a third sensor of a second set of two sensors to control the state of said object in a ninth state; and b) deactivating said third sensor to stop said control in said ninth state;

c) independently activating a fourth sensor of a second set of two sensors to control the state of said object in a tenth state; and d) deactivating said fourth sensor to stop said control in said tenth state;

e) simultaneously activating said third sensor and said fourth sensor to control the state of said object in a third state; and f) simultaneously deactivating said third sensor and said fourth sensor to stop said control in said third state;

g) simultaneously activating said third sensor and said fourth sensor to control the state of said object in a fourth state; and h) simultaneously deactivating said third sensor and said fourth sensor to stop said control in said fourth state;

i) simultaneously activating said third sensor and said fourth sensor to control the state of said object in said third state.

15. A method of using a pair of sensors to control the state of an object, in accordance with claim 6, comprising:

a) independently activating a third sensor of a second set of two sensors to control the state of said object upward; and b) deactivating said third sensor to stop said upward control;

c) independently activating a fourth sensor of a second set of two sensors to control the state of said object downward; and d) deactivating said fourth sensor to stop said downward control;

e) simultaneously activating said third sensor and said fourth sensor to control the state of said object forward; and f) simultaneously deactivating said third sensor and said fourth sensor to stop said forward control;

g) simultaneously activating said third sensor and said fourth sensor to control the state of said object backward; and h) simultaneously deactivating said third sensor and said fourth sensor to stop said backward control;

i) simultaneously activating said third sensor and said fourth sensor to control the state of said object forward.

16. A method of using a pair of sensors to control the state of an object, in accordance with claim 11, comprising:

a) independently activating a third sensor of a second set of two sensors to control the state of said object in a ninth state; and b) deactivating said third sensor to stop said control in said ninth state;

c) independently activating a fourth sensor of a second set of two sensors to control the state of said object in a tenth state; and d) deactivating said fourth sensor to stop said control in said tenth state;

e) simultaneously activating said third sensor and said fourth sensor to control the state of said object in a third state; and f) deactivating said fourth sensor to stop said control of said object in an eleventh state;

g) simultaneously activating said third sensor and said fourth sensor to control the state of said object in said third state; and h) deactivating said third sensor to control the state of said object in a twelfth state;

i) simultaneously activating said third sensor and said fourth sensor to control the state of said object in said third state; and j) simultaneously deactivating said third sensor and said fourth sensor to stop said control in said third state;

k) independently activating a third sensor to control the state of said object in a ninth state; and l) deactivating said third sensor to stop said control in said ninth state;

m) independently activating a fourth sensor to control the state of said object in a tenth state; and n) deactivating said fourth sensor to stop said control in said tenth state;

o) simultaneously activating said third sensor and said fourth sensor to control the state of said object in a fourth state; and p) deactivating said fourth sensor to control the state of said object in a thirteenth state;

q) simultaneously activating said third sensor and said fourth sensor to control the state of said object in said fourth state; and r) deactivating said third sensor to control the state of said object in a fourteenth state;

s) simultaneously activating said third sensor and said fourth sensor to control the state of said object in said fourth state; and t) simultaneously deactivating said third sensor and said fourth sensor to stop said control in said fourth state;

u) independently activating a third sensor to control the state of said object in a ninth state; and v) deactivating said third sensor to stop said control in said ninth state;

w) independently activating a fourth sensor to control the state of said object in a tenth state; and x) deactivating said fourth sensor to stop said control in said tenth state;

y) simultaneously activating said third sensor and said fourth sensor to control the state of said object in said third state.

17. A method of using a pair of sensors to control the state of an object, in accordance with claim 6, comprising:

a) independently activating a third sensor of a second set of two sensors to control the state of said object upward; and b) deactivating said third sensor to stop said upward control;

c) independently activating a fourth sensor of a second set of two sensors to control the state of said object downward; and d) deactivating said fourth sensor to stop said downward control;
e) simultaneously activating said third sensor and said fourth sensor to control the state of said object forward; and
f) deactivating said fourth sensor to control the state of said object forward and upward;
g) simultaneously activating said third sensor and said fourth sensor to control the state of said object forward; and
h) deactivating said third sensor to control the state of said object forward and downward;
i) simultaneously activating said third sensor and said fourth sensor to control the state of said object forward; and
j) simultaneously deactivating said third sensor and said fourth sensor to stop said forward control;
k) independently activating a third sensor of a second set of two sensors to control the state of said object upward; and
l) deactivating said third sensor to stop said upward control;
m) independently activating a fourth sensor of a second set of two sensors to control the state of said object downward; and
n) deactivating said fourth sensor to stop said downward control;
o) simultaneously activating said third sensor and said fourth sensor to control the state of said object backward; and
p) deactivating said fourth sensor to control the state of said object backward and upward;
q) simultaneously activating said third sensor and said fourth sensor to control the state of said object backward; and
r) deactivating said third sensor to control the state of said object backward and downward;
s) simultaneously activating said third sensor and said fourth sensor to control the state of said object backward; and
t) simultaneously deactivating said third sensor and said fourth sensor to stop said backward control;
u) independently activating a third sensor of a second set of two sensors to control the state of said object upward; and
v) deactivating said third sensor to stop said upward control;
w) independently activating a fourth sensor of a second set of two sensors to control the state of said object downward; and
x) deactivating said fourth sensor to stop said downward control;
y) simultaneously activating said third sensor and said fourth sensor to control the state of said object forward.

18. A method of using a pair of sensors to control the state of an object, in accordance with claim 6, comprising:
a) wherein said first sensor is an adjustable first sensor;
b) activating said adjustable first sensor to control the state of said object;
c) increasing said activation of said adjustable first sensor to increase said control of said object; and
d) decreasing said activation of said adjustable first sensor to decrease said control of said object;
e) wherein said second sensor is an adjustable second sensor;
f) activating said adjustable second sensor to control the state of said object;
g) increasing said activation of said adjustable second sensor to increase said control of said object; and
h) decreasing said activation of said adjustable second sensor to decrease said control of said object.

19. A method of using a pair of sensors to control an object comprising:
a) simultaneously activating a first sensor and a second sensor of said pair of sensors to exit a first mode and enter a second mode;
b) activating said first sensor to control said object in a first state; and
c) activating said second sensor to control said object in a second state;
d) simultaneously activating said first sensor and said second sensor to exit said second mode and enter a third mode;
e) wherein the respective modes are entered and exited based on the activation or deactivation of only the two respective first and second sensors and no other sensors.

20. A method of using a pair of sensors to control an object comprising:
a) activating a first sensor to control said object in a first state; and
b) activating a second sensor to control said object in a second state;
c) simultaneously activating said first sensor and said second sensor of said pair of sensors to exit a first mode and enter a second mode;
d) activating said first sensor to control said object in a third state; and
e) activating said second sensor to control said object in a fourth state;
f) simultaneously activating said first sensor and said second sensor to exit said second mode and enter a third mode;
g) wherein the respective modes are entered and exited based on the activation or deactivation of only the two respective first and second sensors and no other sensors.

* * * * *